(12) United States Patent  
Gokemeijer et al.

(10) Patent No.: US 9,202,489 B2
(45) Date of Patent: Dec. 1, 2015

(54) LASER MOUNTED ON EDGE OF A SLIDER

(71) Applicant: Seagate Technology LLC, Cupertino, CA (US)

(72) Inventors: Nils Gokemeijer, Edina, MN (US); Edward Charles Gage, Lakeville, MN (US); Roger L. Hipwell, Eden Prairie, MN (US); Michael Christopher Kautzky, Eagan, MN (US); Scott Eugene Olson, Eagan, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/163,632

(22) Filed: Jan. 24, 2014

(65) Prior Publication Data

US 2015/0213819 A1    Jul. 30, 2015

(51) Int. Cl.
*G11B 11/00* (2006.01)
*G11B 5/48* (2006.01)

(52) U.S. Cl.
CPC ................................. *G11B 5/4866* (2013.01)

(58) Field of Classification Search
None
See application file for complete search history.

(56) References Cited

U.S. PATENT DOCUMENTS

| | | | |
|---|---|---|---|
| 5,390,210 A * | 2/1995 | Fouquet et al. ................. | 372/92 |
| 6,404,706 B1 | 6/2002 | Stovall et al. | |
| 6,850,475 B1 | 2/2005 | Heanue et al. | |
| 7,298,941 B2 | 11/2007 | Palen et al. | |
| 7,511,921 B2 | 3/2009 | Mallary et al. | |
| 8,107,192 B2 | 1/2012 | Sasaki et al. | |
| 8,107,326 B1 | 1/2012 | Hirano et al. | |
| 8,213,271 B2 | 7/2012 | Boone, Jr. et al. | |
| 8,223,459 B2 | 7/2012 | Gage et al. | |
| 8,225,482 B2 | 7/2012 | Suh et al. | |
| 8,243,561 B2 | 8/2012 | Matsumoto | |
| 8,254,212 B2 | 8/2012 | Snyder et al. | |
| 8,310,901 B1 | 11/2012 | Batra et al. | |
| 8,339,905 B2 | 12/2012 | Rausch et al. | |
| 8,339,906 B2 | 12/2012 | Seigler | |
| 8,345,517 B2 | 1/2013 | Hurley et al. | |
| 8,379,494 B2 | 2/2013 | Peng et al. | |
| 8,379,495 B2 | 2/2013 | Boone, Jr. et al. | |
| 8,451,695 B2 | 5/2013 | Olson et al. | |
| 8,456,969 B1 | 6/2013 | Mooney et al. | |
| 8,488,435 B2 | 7/2013 | Snyder | |
| 8,501,536 B2 | 8/2013 | Mooney et al. | |
| 8,525,974 B2 | 9/2013 | Turner et al. | |
| 2008/0056073 A1 | 3/2008 | Shimizu | |
| 2009/0185459 A1 * | 7/2009 | Matsumoto ................. | 369/13.02 |

(Continued)

FOREIGN PATENT DOCUMENTS

| | | | | | |
|---|---|---|---|---|---|
| JP | 2012033211 A | * | 2/2012 | ............... | G11B 5/31 |
| WO | WO 2012014569 A1 | * | 2/2012 | ............... | G11B 5/02 |

OTHER PUBLICATIONS

Seibert et al., "High-index-contrast ridge waveguide laser with thermally oxidized etched facet and metal reflector", Electronics Letters, vol. 46, No. 15, Jul. 22, 2010, 2 pages.

*Primary Examiner* — Wayne Young
*Assistant Examiner* — Mark Fischer
(74) *Attorney, Agent, or Firm* — Hollingsworth Davis, LLC

(57) ABSTRACT

An apparatus that includes a slider having a mounting surface, the mounting surface opposite a media-facing surface of the slider. The apparatus includes a laser diode mounted on a side surface to the mounting surface. The laser diode has an active region of the laser diode is disposed substantially perpendicular to the mounting surface.

18 Claims, 6 Drawing Sheets

(56) References Cited

U.S. PATENT DOCUMENTS

| | | |
|---|---|---|
| 2010/0085846 A1* | 4/2010 | Shimazawa et al. ....... 369/13.14 |
| 2011/0013497 A1 | 1/2011 | Sasaki et al. |
| 2011/0058273 A1 | 3/2011 | Sasaki et al. |
| 2011/0090770 A1* | 4/2011 | Iwanabe et al. ............ 369/13.24 |
| 2011/0216635 A1* | 9/2011 | Matsumoto ................ 369/13.33 |
| 2011/0243176 A1 | 10/2011 | Mooney et al. |
| 2011/0266469 A1 | 11/2011 | Goulakov et al. |
| 2011/0310713 A1* | 12/2011 | Komura et al. ............ 369/13.24 |
| 2012/0201107 A1 | 8/2012 | Peng et al. |
| 2012/0257490 A1 | 10/2012 | Zhou |
| 2013/0084441 A1 | 4/2013 | Huang et al. |
| 2013/0230279 A1 | 9/2013 | Peng et al. |
| 2013/0279312 A1* | 10/2013 | Hurley et al. .............. 369/13.02 |

\* cited by examiner

LASER MOUNTED ON EDGE OF A SLIDER

SUMMARY

The present disclosure is directed to methods, systems and apparatuses related generally to magnetic recording devices used for data storage. More specifically, the systems, methods, and apparatuses described relate to as heat-assisted magnetic recording (HAMR) devices.

In one aspect, an apparatus is disclosed that includes a slider having a mounting surface and a laser diode mounted to the mounting surface of the slider at a side surface of the laser diode. The laser diode has an active region of the laser diode is disposed substantially perpendicular to the mounting surface of the slider.

In another aspect, a system is disclosed that includes a magnetic medium having a plurality of data tracks, a slider, and a laser diode. The slider has a mounting surface operationally spaced from the magnetic medium. The laser diode is mounted to the mounting surface of the slider such that a plurality of wafer layers extend substantially perpendicular to the mounting surface. The laser diode has an etched optical turning element configured to bend an output light within the laser diode substantially 90° to a direction substantially perpendicular to the mounting surface of the slider.

In yet another aspect, a method is disclosed that includes providing a slider having a mounting surface, and mounting an edge-emitting laser diode to the mounting surface such that a plurality of wafer layers extend substantially perpendicular with the mounting surface.

These and other features and aspects of various embodiments may be understood in view of the following detailed discussion and accompanying drawings.

BRIEF DESCRIPTION OF THE DRAWINGS

The discussion below makes reference to the following figures, wherein the same reference number or similar reference number may be used to identify the similar/same component in multiple figures.

DETAILED DESCRIPTION

Figure 1:
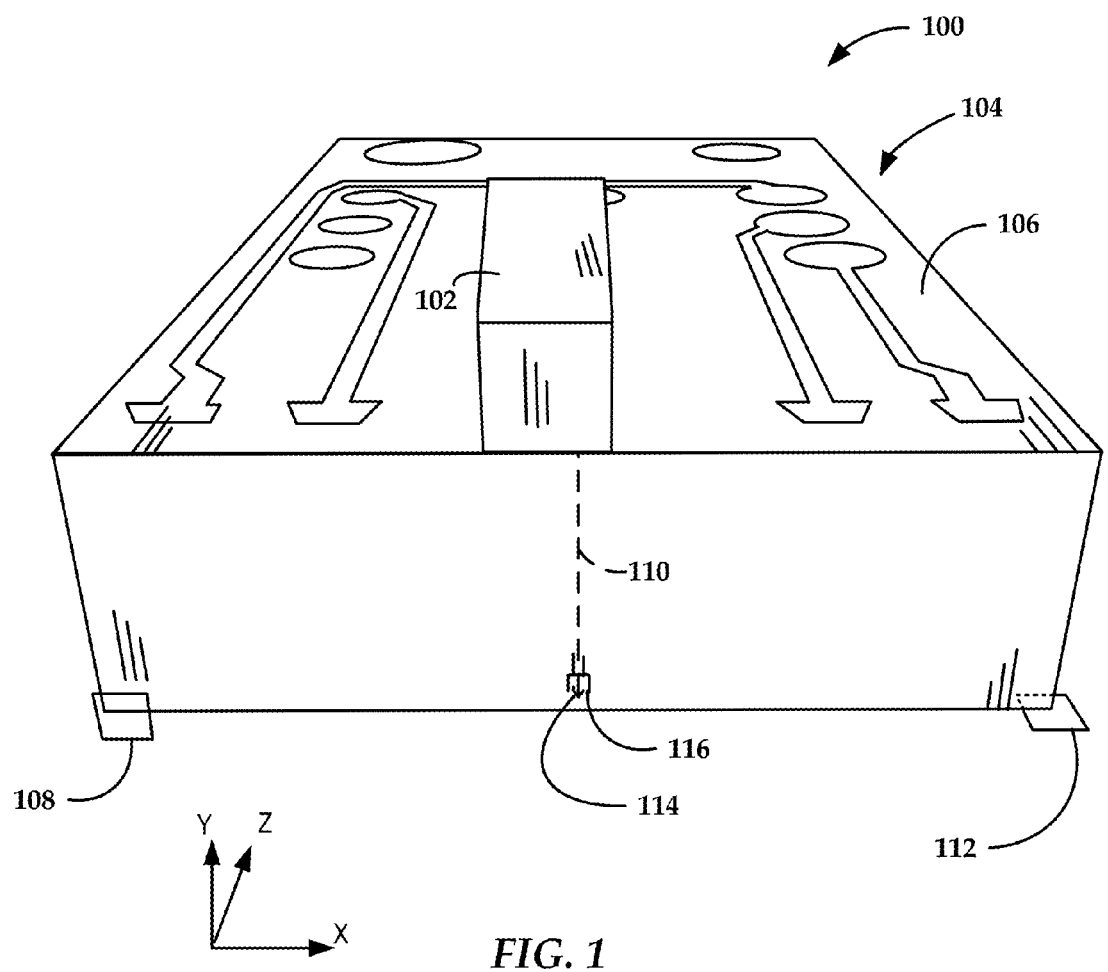
FIG. 1 is an isometric view of a heat-assisted magnetic recording hard drive slider and laser diode according to an example embodiment.

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The present disclosure relates to heat-assisted magnetic recording (HAMR) devices, which may also be described as thermal-assisted magnetic recording (TAMR) and energy-assisted magnetic recording (EAMR). Generally, a HAMR device uses a laser diode or other energy source to heat a magnetic medium while it is being recording. The methods, systems, and apparatuses that are described herein provide for the delivery of laser light from a surface mounted laser diode while reducing, e.g., minimizing, the height of the laser diode and slider combination in order to allow HAMR devices to be more easily utilized for smaller form-factor products.

A HAMR data storage medium has a high magnetic coercivity that is able to overcome superparamagnetic effects (e.g., thermally-induced, random, changes in magnetic orientations) that currently limit the areal data density of conventional hard drive media. In a HAMR device, a small portion, or "hot spot," of the magnetic medium is locally heated to its Curie temperature, thereby allowing magnetic orientation of the medium to be changed at the hot spot while being written to by a transducer (e.g., magnetic write pole).

A HAMR read/write head, sometimes referred to as a slider, includes magnetic read and write transducers similar to those on current hard drives. For example, data may be read by a magnetoresistive sensor that detects magnetic fluctuations of the moving medium. Data may be written to the magnetic medium by a write coil that is magnetically coupled to a write pole. A HAMR slider may also include a source of energy, such as a laser diode, and integrated optics (an optical delivery path) through the slider that delivers the energy to the surface of the medium. In some configurations, the laser diode is a separately-manufactured device that is attached to the slider. During the attachment procedure, it is desirable to precisely align the laser diode to the slider during assembly to reduce, e.g., minimize, optical transmission losses in the optical delivery path.

In a HAMR slider, light is launched into optics components from the laser diode. One way to launch light into a slider is from an externally mounted laser. When the externally mounted laser is on a slider the configuration is known as laser-on-slider (LoS) light delivery. In one configuration the laser diode can be disposed in a vertical plane to the slider allowing light emanating from the laser diode to be inserted directly into the integrated optics in the slider. A submount assembly may be required with LoS configurations to hold the laser diode in position. Other configurations, such as a configuration where the laser diode sits in a recessed cavity in the slider, (called a laser-in-slider (LiS)) are also known.

Current HAMR devices can utilize a slider body that is 200 µm thick (height), 1000 µm long, and 700 µm wide. To be able to generate enough power (10-50 mW) with adequate reliability (>20,000 laser power-on hours), a long active region (>250 µm) is desired. Thus, current laser diode configurations have a length >400 µm for reliability, a width >150 µm for handling and a thickness >100 µm for handling. While prior LoS and LiS configurations have succeeded, the disk to disk spacing for some smaller form-factor products hard drives makes the current LoS mounting configuration undesirably tall (200 µm slider height plus 250 µm laser height). LiS mounting configurations can be challenging considering the limited space along the trailing edge portion of the slider which also houses the magnetic transducer component, electrical connections, and optical/near-field transducer elements.

It is herein disclosed techniques and methods that allow for a mounting configuration where the laser diode is rotated and mounted to the slider on its side surface such that the active region of the laser diode is disposed substantially perpendicular to the mounting surface of the slider. This configuration reduces the height of the assembled laser diode and slider to less than about 350 µm and allows for more space to better meet disk to disk spacing requirements for smaller form-factor products. Additionally, this configuration allows for a larger contact area with the slider, which makes the assembly of the laser diode and slider more robust with more surface area contacted for cooling. The configuration can eliminate or reduce the need for additional components such as a submount, which reduces cost makes assembly of the laser diode to the slider easier. The configuration also allows for easier alignment of the laser diode relative to the slider body during assembly to reduce, e.g., minimize, optical transmission losses in the optical delivery path. Alignment can be accomplished because the mounting surface of the laser diode can be cleaved and a top surface of the laser diode (when it was still in wafer form) can be used as a physical reference (either with reference to the slider or to fabrication tooling). The laser output facet can be referenced to these two surfaces (the mounting surface and the top surface) with tight tolerances, enabling fast and easy alignment of the output facet to the input coupler on the slider.

In reference now to FIG. 1, a perspective view shows a slider assembly 100 for HAMR according to an example embodiment. In this example, a laser diode 102 is mounted to a mounting surface 106 of a slider body 104. The trailing surface 108 adjoins the mounting surface 106. The laser diode 102 extends along mounting surface 106 to adjacent the trailing surface 108. The laser diode 102 in the example embodiment is a folded-cavity edge-emitting laser (FC-EEL), and emits light in the negative y-direction. However, in other embodiments, the laser diode can comprise other semiconductor lasers. A submount (not shown) can be used in some embodiments and can be mounted to the laser diode 102 as well as the mounting surface 106 of the slider body 104. As will be discussed subsequently, one or more of the slider surfaces can be used as physical references to orient the laser output in the desired direction so that it can be precisely coupled to an optical pathway 110 within the slider body 104.

The optical pathway 110 is disposed adjacent the trailing surface 108 and directs the energy so that it is emitted from a media-facing surface 112 (in some cases called an air bearing surface) of the slider body 104, thereby heating a proximate magnetic medium (not shown) that moves underneath the slider assembly 100.

A transducer region 114 may be located proximate read/write head 116 to provide local heating of the media during write operations. The read/write head 116 generates a magnetic field and an optical transducer, generally located in the transducer region 114 adjacent the optical pathway 110 and the read/write head 116, receives energy from the laser diode 102 and directs the energy to the recording medium. The optical transducer may include a near-field transducer (NFT) that directs the energy via surface plasmon resonance. The optical pathway 110 includes optical components (e.g., optical resonance cavities, mirrors, couplers, decouplers, beam expanders etc.) that are integrated in the slider body 104 and facilitate delivering energy from the laser diode 102 to the transducer region 114.

In the example embodiment shown in FIG. 1, laser diode 102 can be approximately 400 µm long in the z-direction and about 100 to 150 µm wide in the x-direction and y-direction of the Cartesian coordinate system. As will be discussed subsequently, the laser diode 102 is mounted on top of the mounting surface 106 (i.e., a top surface) of slider body 104 by methods such as continuous soldering and/or discrete bonding with, for example, solder or adhesive. In some cases, the opposing exposed side surfaces of the laser diode 102 (which both can extend generally perpendicular to the mounting surface 106 in some embodiments) may be partially or wholly metallized to provide electrical connectivity, heat sinking, and current density control for the laser diode 102.

The laser diode 102 and slider body 104 can be formed separately using integrated circuit/optics manufacturing techniques known in the art. For example, the components may be formed by (among other things) depositing layers of material on a wafer substrate, creating features in the layers using photolithography and chemical/mechanical polishing, and dividing the wafer into individual components. Afterwards, the laser diode 102 is mounted to the slider body 104 and any submount (if utilized). During assembly, the laser diode 102 can be precisely aligned with the optical pathway 110 to ensure sufficient energy is delivered to the medium (not shown). As will be discussed subsequently, one or more surfaces (e.g., the top and bottom (mounting) surfaces) of the slider body 104 can be used as physical references for alignment of the laser diode 102 relative to the slider body 104 during the assembly process.

Figure 2:
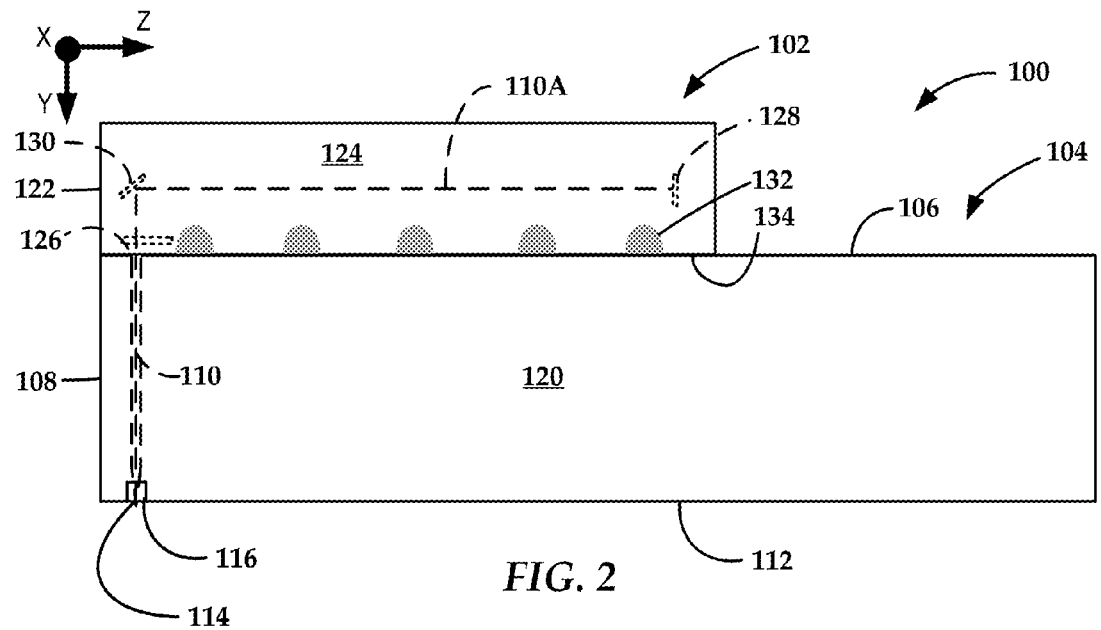
FIG. 2 is a plan view of a first side of the hard drive slider and laser diode of FIG. 1.

FIG. 2 is a plan view of one side of the slider assembly 100. FIG. 2 illustrates features of slider body 104 including the mounting surface 106, the media-facing surface 112, the trailing surface 108, and a side surface 120, as well as features of the laser diode 102 including a trailing surface 122, a side surface 124, an output coupler 126, an end facet 128, and an optical turning element 130. FIG. 2 additionally illustrates discrete bonds 132.

The laser diode 102 interfaces with and is mounted to the mounting surface 106 of slider body 104. The substantially planar mounting surface 106 extends to adjoin the trailing surface 108 and side surface 120. The optical pathway 110, transducer region 114, and read/write head 116 are disposed in the slider body 104 adjacent the trailing surface 108 and the optical pathway 110 is optically coupled to the output coupler 126, the end facet 128, the optical turning element 130.

In some embodiments, the trailing surface 122 of laser diode 102 can generally align with the trailing surface 108. The side surface 124 adjoins the trailing surface 122 and extends to an opposing end surface. Although not shown in the embodiment of FIG. 2, the side surface 124 can be partially or fully metalized in some instances. In other instances, one or more surfaces of the laser diode 102 including the side surface 124 may interface with and be mounted to a submount.

FIG. 2 illustrates the output coupler 126, the end facet 128, the optical turning element 130, as well as an optical pathway 110A in phantom. As shown in FIG. 2, the output coupler 126 is in optical communication with the end facet 128 via the optical turning element 130 and other components to provide for the optical pathway 110A within the laser diode 102. The output coupler 126 comprises an output facet and is disposed along a base surface 134 of the laser diode 102. The output coupler 126 is adapted to couple light from optical pathway 110A into the optical pathway 110 in the slider body 104. In some instances the output coupler 126 and the optical turning element 130 are positioned toward a trailing portion of the laser diode 102. In one embodiment, the optical turning element 130 can be disposed at substantially 45° to the output coupler 126 and mounting surface 106 to provide that output light traveling along the optical pathway 110A is bent (redirected) substantially 90° in a direction substantially perpendicular to the mounting surface 106. Light generated by an active region of the laser diode 102 is reflected by the end facet 128 to the optical turning element 130 along a portion of the optical pathway 110A which extends along a length of the laser diode 102 substantially in the z-direction.

Figure 3:
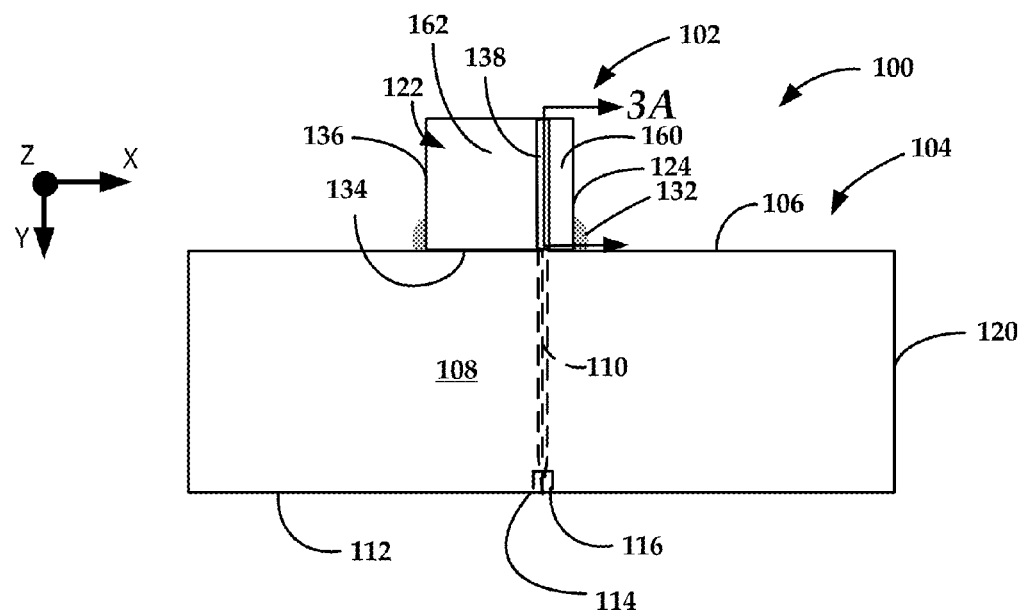
FIG. 3 is a plan view of a second side of the hard drive slider and laser diode of FIG. 1.

The embodiment of FIGS. 2 and 3 utilizes the discrete bonds 132 of solder or adhesive to affix the laser diode 102 to the slider body 104. The discrete bonds 132 are spaced from one another using solder jetting technology which directs a focused stream of bonding agent to a desired location in a fast and efficient manner. Such technology is commercially available from Optomec, in Albuquerque, N. Mex., PacTech in Berlin, Germany, and MicroFab in Plano, Tex. In brief, the delivery apparatus utilizes a sheath gas that creates an annular flow around an aerosol stream and collimates the aerosol stream into a focused stream that can then be directed to a target location. The bonding agent can be heated within the delivery apparatus utilizing laser or other heating source(s) and then delivered reducing reflow associated with other soldering techniques.

FIG. 3 is a plan view of a trailing side of the slider assembly 100. Similar to FIG. 2, FIG. 3 shows the mounting surface 106, the media-facing surface 112, the trailing surface 108, and the side surface 120 of slider body 104, and additionally shows the trailing surface 122, the side surface 124, the base surface 134, a second side surface 136, and an active region 138.

In the illustrated embodiment, the second side surface 136 is arranged on an opposing side of the laser diode 102 from the side surface 124. The side surface 124 and second side surface 136 adjoin the base surface 134 and can be arranged substantially perpendicular to the mounting surface 106. Similar to the side surface 124, the second side surface 136 can be partially of fully metalized as desired. In other instances, one or more surfaces of the laser diode 102 including the second side surface 136 may interface with and be mounted to a submount. In the embodiment of FIG. 3, the active region 138 of the laser diode 102 is illustrated and is arranged substantially perpendicular to the mounting surface 106. The active region 138 is disposed between a first cladding 160 and a second cladding 162. As illustrated in the FIGURES, the laser diode 102 comprises a semiconductor laser comprised of a plurality of wafer layers that extend substantially in parallel with the active region 138. In particular, the laser diode 102 may be fabricated using solid state batch processing on a larger wafer scale, and after processing the wafer may be diced or otherwise subdivided into a multitude of smaller devices, one of which is the laser diode 102. Substrate portions of the laser diode 102 may be the diced portion of an initial crystalline wafer on which a plurality of thinner wafer layers are grown, deposited, and/or patterned on a side of the wafer using, for example, photolithography and chemical, plasma, or other etching processes. These wafer layers may include a layer of gain medium which may form one or more quantum wells with adjacent layers, and a p-contact and an n-contact. The distribution of electrical current flow between the re-contact and opposing p-contact define the active region 138 of the gain medium. As is known, laser light propagates within the laser diode 102 generally along the active region between the facets as previously discussed in reference to FIG. 2.

Figure 3A:
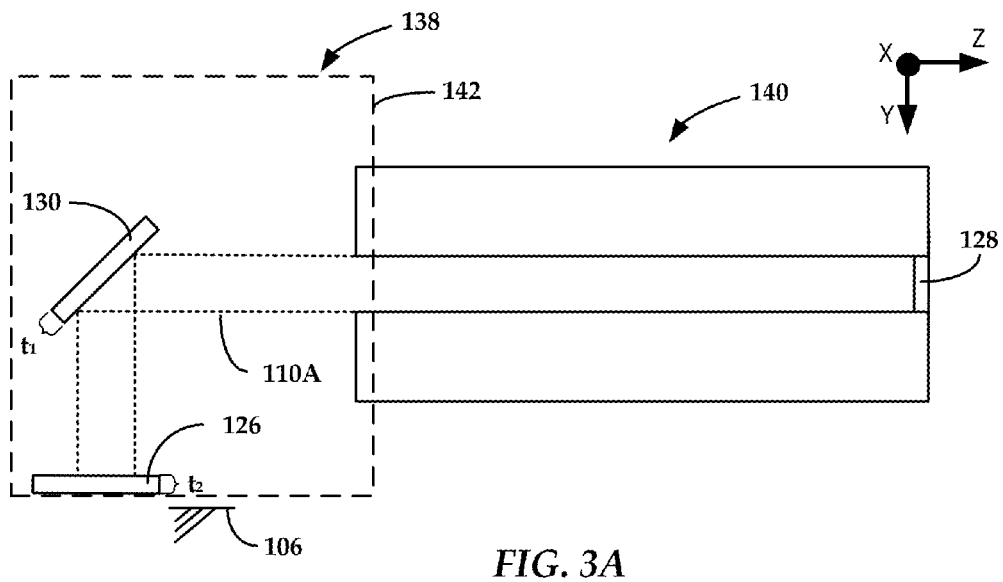
FIG. 3A is a cross-section extending through an active region of the laser diode of FIG. 3 and illustrating additional components of the laser diode.

FIG. 3A is a cross-section extending through the active region 138 illustrated in FIG. 3. Although the cross-section of FIG. 3A extends through the active region 138 additional components such as an optical resonance cavity 140, which can be disposed in adjacent wafer layers of the laser diode 102 such as the cladding are illustrated in FIG. 3A. In addition to the optical resonance cavity 140, FIG. 3A illustrates the output coupler 126, the end facet 128, the optical turning element 130, the optical pathway 110A, and the mounting surface 106.

Various components such as the output coupler 126 and the optical turning element 130 can be etched or otherwise formed in the active region and/or in epitaxial layers adjacent thereto. In particular, the output coupler 126 and optical turning element 130 can be disposed in an unpumped (e.g., electrically restricted) window region 142 of the active region 138 (FIG. 3).

As shown in FIG. 3A, the optical resonance cavity 140 (e.g., a waveguide) extends generally along a z-axis in the cladding. However, in other embodiments the optical resonance cavity 140 may include turns or bends as disclosed in U.S. Pat. Nos. 8,456,969 and 8,501,536, the disclosures of which is incorporated by reference. A portion of the optical pathway 110A is defined by the optical resonance cavity 140. As discussed, the optical pathway 110A (the boundaries of which are illustrated in phantom when not disposed within the optical resonance cavity 140) extends between the end facet 128 and the optical turning element 130. The optical turning element 130 is disposed at substantially 45° to the end facet 128 and the output coupler 126 to bend the light traveling along the optical pathway 110A substantially 90° in a direction substantially perpendicular to the mounting surface 106 and the output coupler 126.

The optical turning element 130 can comprise a reflective mirror formed by etching and can have a thickness $t_1$ of between about 0.1 µm to about 4.0 µm. In some instances, the optical turning element 130 has a reflectivity between about 90% and 99.9%. Additionally, coatings and/or treatments can be used on the optical turning element 130 to adjust the reflectivity and increase reliability.

The output coupler 126 and the end facet 128 can be fabricated into the wafer using various processes including etching, cleaving, dicing, polishing, etc. For example, the output coupler 126 can be formed by a dicing process that separates laser diode 102 (and additional laser diodes) from a larger wafer. In other cases, the output coupler 126 can be etched prior to the dicing process.

In order to reduce absorption and heating at the output coupler 126, the output coupler 126 can be located in the window region 142 as restricting electrical current from flowing at the output region can increase reliability. Similarly, coatings and/or treatments can be used to adjust the reflectivity and increase reliability. In some embodiments, the output coupler 126 will have a thickness $t_2$ that differs from the thickness $t_1$ of the optical turning element 130. In some cases, the output coupler 126 has a reflectivity between about 4.0% and 30.0%.

Figure 4:
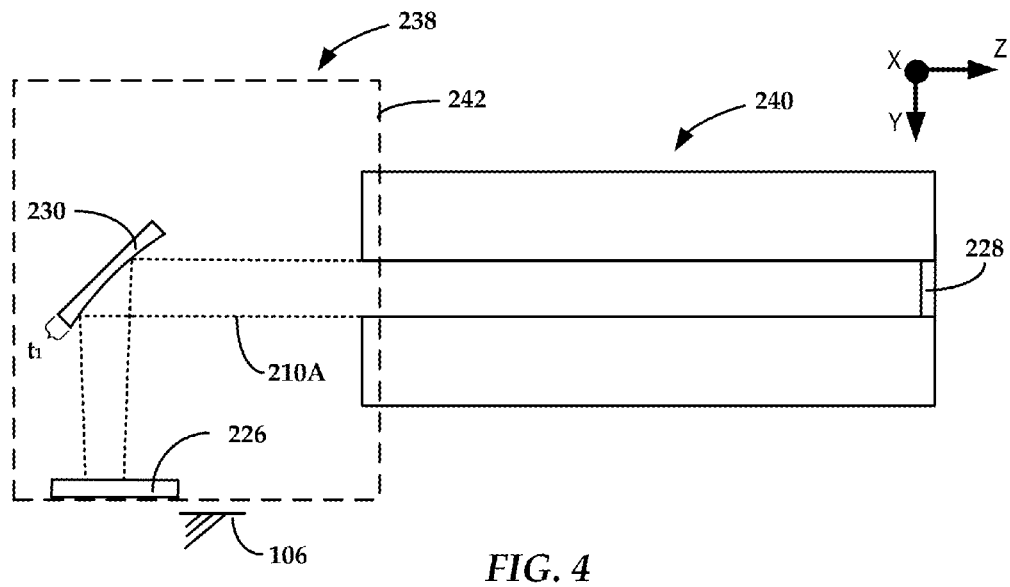
FIG. 4 is a cross-section of an active region that illustrates components of the laser diode according to another exemplary embodiment.

FIG. 4 shows a cross-section of another active region embodiment that can be used with a laser diode such as the laser diode 102 (FIGS. 1-3). Although the cross-section of FIG. 4 extends through the active region 238, additional components such as an optical resonance cavity 240, which can be disposed in adjacent wafer layers of the laser diode 102 such as the cladding, are illustrated in FIG. 4. FIG. 4 illustrates the mounting surface 106 and components of the laser diode 102, which include an optical resonance cavity 240, an unpumped window region 242, an output coupler 226, an end facet 228, an optical turning element 230, and an optical pathway 210A.

In the embodiment of FIG. 4, a surface of the optical turning element 230 is curved to vary the spot size of the optical pathway 210A at the output coupler 226. Although optical turning element 230 is illustrated with a concave surface in FIG. 4 that collimates the optical pathway 210A, in some instances the optical turning element 230 can be provided with a convex surface that expands the optical pathway 210A.

Figure 5:
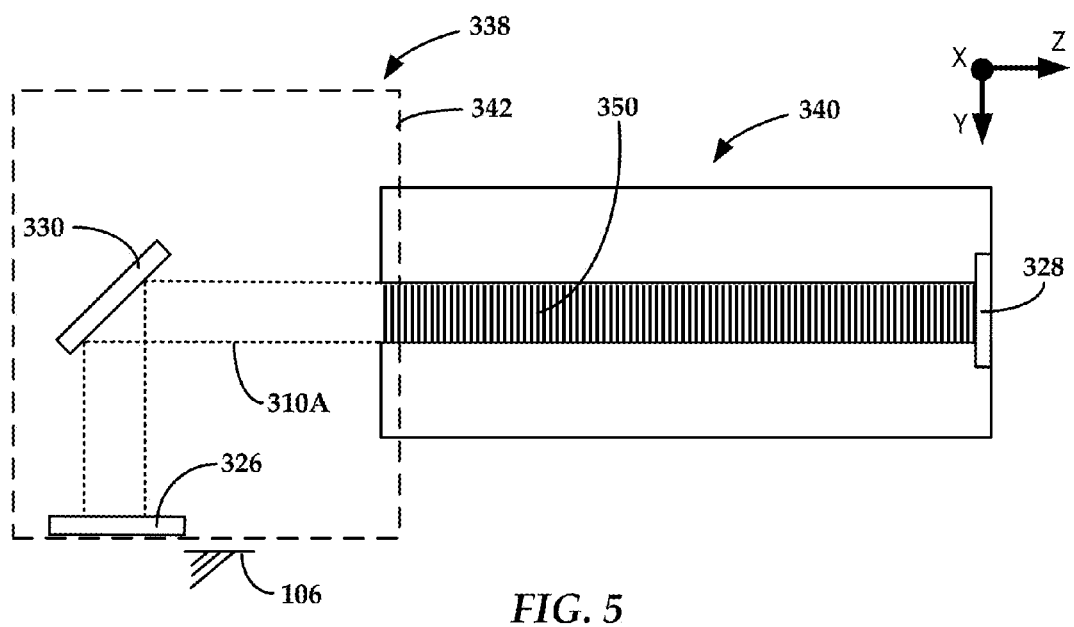
FIG. 5 is a cross-section of an active region that illustrates components of the of the laser diode according to yet another exemplary embodiment.

FIG. 5 shows a cross-section of another embodiment that can be used with a laser diode such as the laser diode 102 (FIG. 1-3). Although the cross-section of FIG. 5 extends through the active region 338 additional components such as an optical resonance cavity 340, which can be disposed in adjacent wafer layers of the laser diode 102 such as the cladding, are illustrated in FIG. 5. FIG. 5 illustrates the mounting surface 106 and components of the laser diode 102, which include an optical resonance cavity 340, an unpumped window region 342, an output coupler 326, an end facet 328, an optical turning element 330, and an optical pathway 310A.

The optical resonance cavity 340 (e.g., a waveguide) extends generally along a z-axis in the cladding. The optical resonance cavity 340 can have a distributed Bragg reflector (DBR) 350 disposed therein (i.e., formed through the optical pathway), or between the optical resonance cavity 340 and the end of the laser. The DBR 350 is composed of a regular pattern etched into a portion of the waveguide that is filled with a dielectric material that has a different index of refraction from the waveguide core, forming a grating designed to reflect a portion of light along the optical pathway 310A as desired. The DBR 350 is positioned in the optical resonance cavity 340 and reflects a portion of the light back along the optical pathway 310A to the optical turning element 330. Such a configuration can allow the edge of the output coupler 326 to be cleaved or etched during the wafer process. The use of a DBR either disposed in or disposed beyond the resonance cavity 340 reduces or eliminates the need for the end facet 328 to have a high reflectivity. Thus, the end facet 328 does not need to be cleaved while output coupler 326 can be cleaved. This allows the number of fabrication steps to be reduced.

Figure 6:
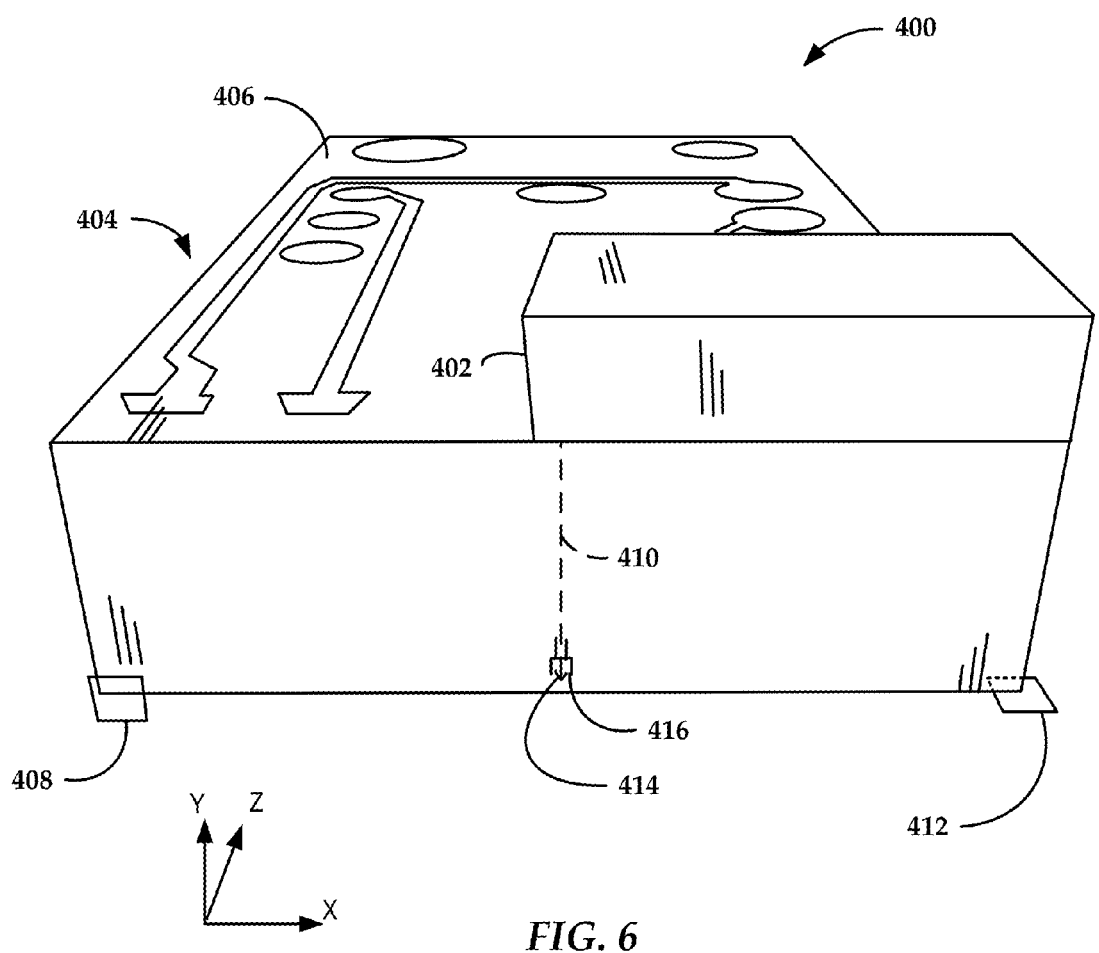
FIG. 6 is an isometric view of a heat-assisted magnetic recording hard drive slider and laser diode according to another example embodiment.

FIG. 6 shows a perspective view of another embodiment of a slider assembly 400 for HAMR. Slider assembly 400 includes components similar to those previously discussed with regard to FIGS. 1-3 including a laser diode 402, a slider body 404, a mounting surface 406, a trailing surface 408, an optical pathway 410, a media-facing surface 412, a transducer region 414, and a read/write head 416.

The laser diode 402 in this example embodiment is a folded-cavity edge-emitting laser (FC-EEL), and emits light in the negative y-direction but is turned 90° along the mounting surface 406 (i.e. in the x-z plane) relative to the embodiment of FIG. 1. In the example embodiment, the laser diode 402 is mounted to the mounting surface 406 of the slider body 404 and has a side surface that is substantially aligned with the trailing surface 408. The top and bottom (mounting) surfaces of the laser diode 402 can be used as physical references to orient the laser output in the desired direction so that it can be precisely coupled to an optical pathway 410 within the slider body 404.

The arrangement of FIG. 6, with the laser diode 402 rotated 90° along the mounting surface 406 (i.e. in the x-z plane) creates a TE-Mode like input coupled light. A TE-mode configuration may utilize a longer laser diode length (i.e. a length >200 μm long in the x-direction) compared to the standard edge-emitting laser (EEL) LoS configuration.

A standard EEL emits light in TE (transverse electric) mode, i.e. the E-field of the laser is parallel to the deposition plane of the epitaxial layers. In LIS or LOS configurations this means that the E-field is in the cross-track direction. For some Near Field Transducer designs the E-field is desired to be in the cross-track direction. The TE-mode configuration shown in FIG. 6 provides TE-mode like input coupled light from the FC-EEL laser diode.

For other NFT designs it is sometimes desirable to have the E-field in the down-track direction. The TM-mode configuration shown in FIG. 3 rotates the epitaxial layer orientation 90° in the trailing edge plane compared with a standard EEL LoS configuration. Thus, the embodiment discussed in relation to FIG. 3 can provide TM-mode like input coupled light if desired.

Figure 7:
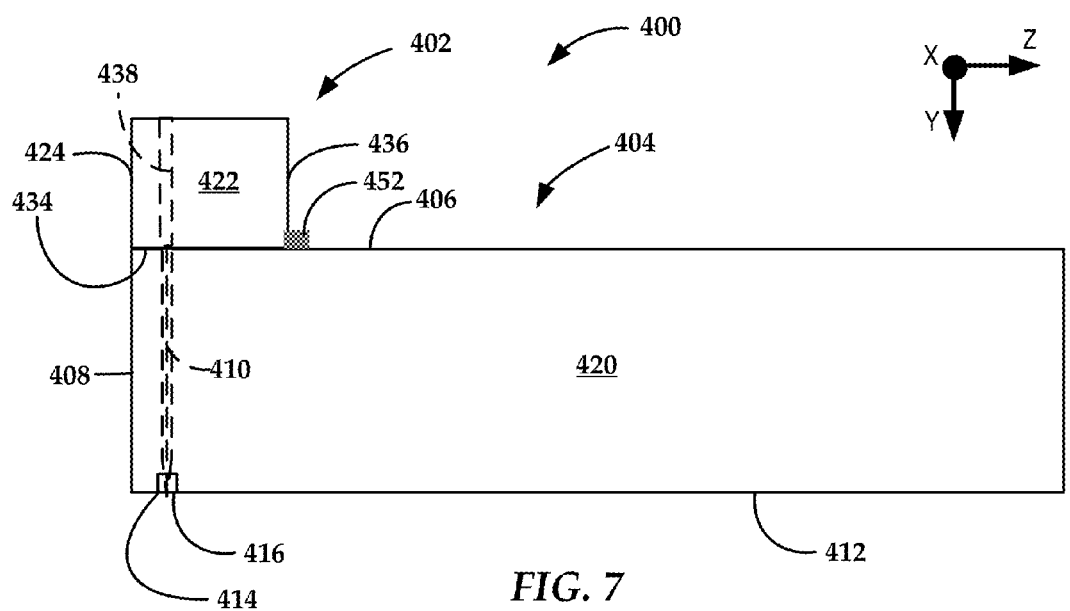
FIG. 7 is a plan view of a first side of the hard drive slider and laser diode of FIG. 6.
Figure 8:
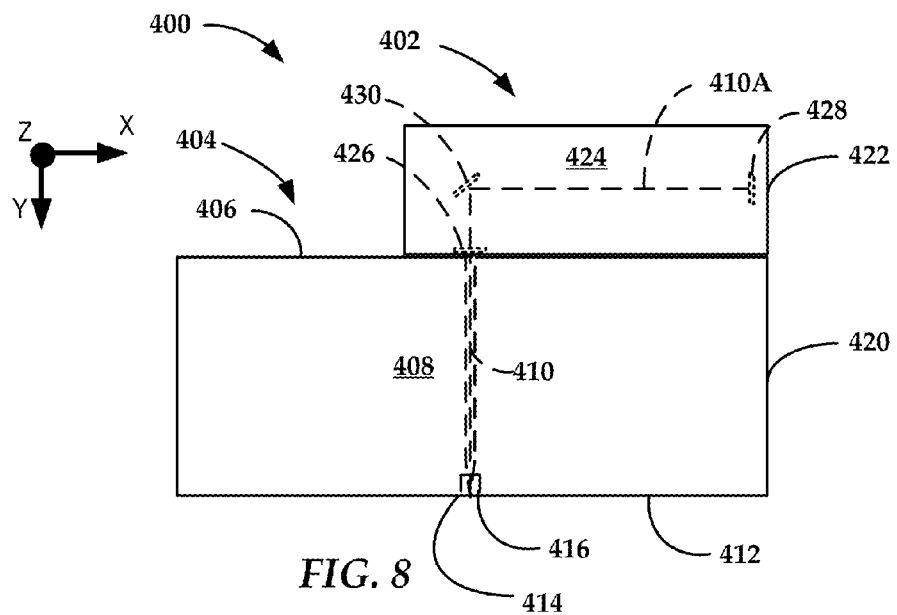
FIG. 8 is a plan view of a second side of the hard drive slider and laser diode of FIG. 6.

FIGS. 7 and 8 show plan views of one side of the slider assembly 400. FIG. 7 illustrates features of slider body 404 including the mounting surface 406, the trailing surface 408, the optical pathway 410, the media-facing surface 412, the transducer region 414, the read/write head 416, and a side surface 420, as well as features of the laser diode 402 including an end surface 422, a side surface 424, a second side surface 436, and an active region 438. FIGS. 7 and 8 additionally illustrate a continuous bond 452. FIG. 8 additionally illustrates an optical pathway 410, a transducer region 414, a read/write head 416, an output coupler 426, an end facet 428, an optical turning element 430, and an optical pathway 410A.

The laser diode 402 interfaces with and is mounted to the mounting surface 406 of the slider body 404. The substantially planar mounting surface 406 extends to adjoin the trailing surface 408 and the side surface 420. With regard to the laser diode 402, the side surface 424 adjoins end surface 422 and extends to an opposing end surface.

The end surface 422 of laser diode 402 can generally align with the side surface 420 of the slider body 404. In some instances the side surface 424 of the laser diode 402 can generally align with the trailing surface 408 of the slider body 404. Although not shown in the embodiment of FIG. 7, the side surface 424 and/or the opposing second side surface 436 can be partially of fully metalized in some instances. In other instances, one or more surfaces of the laser diode 102 including the side surface 424 may interface with and be mounted to a submount.

In FIG. 7, the second side surface 436 is arranged on an opposing side of the laser diode 402 from the side surface 424. The side surface 424 and second side surface 436 can adjoin a base surface 434 and be arranged substantially perpendicular to the mounting surface 406. Additionally in FIG. 7, the active region 438 of the laser diode 402 is illustrated in phantom and is arranged substantially perpendicular to the mounting surface 406. The continuous bond 452 (e.g., solder) can be disposed along first and/or second side surfaces 424 and 436 of the laser diode 402 to mount, heat sink, and electrically connect the laser diode 402 to the slider body 404.

As illustrated in phantom in FIG. 8, the optical pathway 410, transducer region 414, and read/write head 416 are disposed in the slider body 404 adjacent the trailing surface 408 and the optical pathway 410 is optically coupled to the output coupler 426, the end facet 428, the optical turning element 430. Although the orientation of the laser diode 402 has changed in FIGS. 6-8 relative to FIGS. 1-3, the function and arrangement of individual components remains substantially the same, and therefore, will not be discussed in great detail.

As discussed, one or both of the side surface 424 of the laser diode 402 generally aligns with trailing surface 408 and/or the end surface 422 of the laser diode 402 generally aligns with the side surface 420 of the slider body 404. The configuration of FIGS. 6-8 allows the laser diode 402 to be aligned with the optical pathway 410 as the trailing surface 408 and/or the side surface 420 can be used as physical reference for alignment of the laser diode 402 during the assembly process.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the disclosure be limited not with this detailed description, but rather determined by the claims appended hereto.

What is claimed is:

1. An apparatus, comprising:
   a slider having a mounting surface, a leading surface, a trailing surface, and two opposing side surfaces joining the leading surface and the trailing surface, the mounting surface opposite a media-facing surface of the slider; and
   a laser diode mounted flush with the trailing surface and one of the side surfaces of the slider, the laser diode comprising:
      a base surface;
      an active region layer that extends between the two opposing side surfaces of the slider, the active region layer parallel to the trailing surface of the slider;
      and an optical turning element in an unpumped window of the active region, the base surface mounted to the mounting surface of the slider, the active region layer disposed substantially perpendicular to the mounting surface.

2. The apparatus of claim 1, wherein the optical turning element comprises an etched light directing mirror.

3. The apparatus of claim 1, wherein the optical turning element has a curved surface that changes the spot size of a light beam emitted from the active region.

4. The apparatus of claim 1, the laser diode further comprising:
   an optical resonance cavity; and
   a distributed Bragg reflector disposed in optical communication with the optical resonance cavity.

5. The apparatus of claim 1, wherein the laser diode includes an optical resonance cavity and the optical turning element is configured to bend output light from the optical resonance cavity substantially 90° to a direction substantially perpendicular to the mounting surface of the slider.

6. The apparatus of claim 1, wherein the laser diode has an output coupler that is cleaved, polished, or etched into the side surface in the unpumped window.

7. The apparatus of claim 6, wherein the laser diode has a facet that is optically coupled to the output coupler via the optical turning element.

8. The apparatus of claim 1, wherein the laser diode includes first and second opposing side surfaces adjoining the base surface, and wherein at least one of the first and second side surfaces are connected to the mounting surface by one or more of soldering and bonding.

9. The apparatus of claim 1, wherein the laser diode is oriented on the slider for a TE mode coupling into an optical pathway of the slider, such that an E-field of the laser is in a cross-track direction.

10. The apparatus of claim 1, wherein the laser diode comprises a folded-cavity edge-emitting laser diode.

11. The apparatus of claim 1, wherein the slider comprises:
    a near-field transducer proximate the media-facing surface; and
    an optical pathway between the near-field transducer and the output facet of the laser diode, output light of the laser diode being TE mode coupled into the near-field transducer via the optical pathway.

12. An apparatus, comprising:
    a slider having a mounting surface, a leading surface, a trailing surface, and two opposing side surfaces joining the leading surface and the trailing surface, the mounting surface opposite a media-facing surface of the slider and operationally spaced from the magnetic medium; and
    a laser diode mounted to the mounting surface of the slider such that a plurality of wafer layers extend substantially perpendicular to the mounting surface and parallel to the leading surface of the slider, the laser diode mounted flush with the trailing surface of the slider and one of the side surfaces of the slider, the laser diode having an etched optical turning element configured to bend an output light within the laser diode substantially 90° to a direction substantially perpendicular to the mounting surface of the slider, the output light being TE mode coupled into an optical pathway of the slider; and
    a near-field transducer proximate the media-facing surface and coupled to receive the output light at the TE mode.

13. A method comprising:
    providing a slider having a mounting surface, a leading surface, a trailing surface, and two opposing side surfaces joining the leading surface and the trailing surface, the mounting surface opposite a media-facing surface of the slider; and
    mounting a folded-cavity edge-emitting laser diode to the mounting surface such that a plurality of wafer layers extend substantially perpendicular with the mounting surface and parallel to the trailing edge surface of the slider, the laser diode mounted flush with the trailing surface and one of the side surfaces of the slider.

14. The method of claim 13, further comprising etching an unpumped window of an active region to create a light directing mirror configured to bend a light within the laser diode substantially 90° into a direction substantially perpendicular to the mounting surface.

15. The method of claim 14, wherein the mounting of the folded-cavity edge-emitting laser diode includes:
    cleaving a base surface of the laser diode;
    aligning an end surface of the laser diode to one of the two opposing side surfaces of the slider and aligning a side surface of the laser diode to the trailing surface of the slider; and
    attaching the laser diode by one or more of bonding and soldering.

16. The method of claim 13, further comprising forming an output coupler along a mounting surface interfacing edge of one or more of the wafer layers by one or more of etching, polishing, and cleaving.

17. The method of claim 16, further comprising forming a facet along a non-mounting surface interfacing edge of the one or more of the wafer layers by one or more of etching, polishing, and cleaving.

18. The method of claim 13, further comprising:
TE mode coupling output light of the laser diode to an optical pathway of the slider; and
TE mode coupling the output light from the optical pathway to a near-field transducer proximate the media-facing surface.

* * * * *